United States Patent [19]

Usuki et al.

[11] Patent Number: 5,489,480
[45] Date of Patent: Feb. 6, 1996

[54] MAGNETIC RECORDING MEDIUM AND PROCESS FOR PRODUCING THE SAME

[75] Inventors: Kazuyuki Usuki; Tadashi Yasunaga, both of Kanagawa, Japan

[73] Assignee: Fuji Photo Film Co., Ltd., Kanagawa, Japan

[21] Appl. No.: 307,107

[22] Filed: Sep. 16, 1994

Related U.S. Application Data

[63] Continuation of Ser. No. 81,700, Jun. 25, 1993, abandoned.

[30] Foreign Application Priority Data

Jun. 26, 1992 [JP] Japan .................................. 4-191335
Jul. 7, 1992 [JP] Japan .................................. 4-201810

[51] Int. Cl.$^6$ ........................ B32B 27/00; G11B 5/66; B05D 5/12
[52] U.S. Cl. ............... 428/421; 428/694 T; 428/694 TP; 428/694 TF; 428/695; 428/900; 427/127; 427/128; 427/130; 427/131; 427/132
[58] Field of Search ......................... 428/694 T, 694 TP, 428/694 TF, 421, 900, 695; 427/127, 128, 130, 131, 132

[56] References Cited

U.S. PATENT DOCUMENTS

| 5,037,710 | 8/1991 | Frew et al. .............................. 428/695 |
|---|---|---|
| 5,069,973 | 12/1991 | Saito et al. ............................... 423/421 |
| 5,091,249 | 2/1992 | Nishikawa et al. ...................... 428/336 |
| 5,094,897 | 3/1992 | Morita et al. .............................. 428/64 |

FOREIGN PATENT DOCUMENTS

| 325720 | 2/1991 | Japan . |
|---|---|---|
| 5166173 | 7/1993 | Japan . |

*Primary Examiner*—Leszek Kiliman
*Attorney, Agent, or Firm*—Sughrue, Mion, Zinn, Macpeak & Seas

[57] ABSTRACT

Disclosed is a process for producing a magnetic recording medium comprising subjecting a ferromagnetic metal thin film formed on a non-magnetic support by vacuum film formation to a high humidity treatment in an atmosphere of from 50 to 90% RH at a temperature of from 10° to 50° C. and then applying a lubricant having a polar group in the molecule thereof to the thus treated ferromagnetic metal thin film, and a magnetic recording medium comprising a non-magnetic support having thereon a ferromagnetic metal thin film, wherein the ferromagnetic metal thin film has provided thereon a double lubricant layer comprising (i) a lower layer comprising a polar group-containing perfluoropolyether and (ii) an upper layer comprising a perfluoropolyether having no polar group, the polar group-containing perfluoropolyether has a viscosity of from 200 to 1000 cSt at room temperature and the perfluoropolyether having no polar group has a viscosity of 50 cSt or less at room temperature.

11 Claims, 1 Drawing Sheet

FIG. 1

MAGNETIC RECORDING MEDIUM AND PROCESS FOR PRODUCING THE SAME

This is a Continuation of application Ser. No. 08/081,700 filed Jun. 25, 1993, now abandoned.

FIELD OF THE INVENTION

This invention relates to a ferromagnetic metal thin film with excellent electromagnetic conversion characteristics for high-density magnetic recording and more particularly to a magnetic recording medium with excellent running durability and a process for producing the medium.

BACKGROUND OF THE INVENTION

As compared with coated type magnetic recording media whose magnetic layer mainly comprising a ferromagnetic powder and a binder resin, ferromagnetic metal thin film type magnetic recording media comprising a non-magnetic support having formed thereon a thin film of a ferromagnetic metal by vacuum film formation, such as vacuum evaporation, sputtering, and ion plating, exhibit excellent electromagnetic conversion characteristics because of no use of a binder resin in the magnetic layer and have been attracting attention as media for high-density magnetic recording. Some of the ferromagnetic metal thin film type media have so far been put to practical use.

In particular, vacuum evaporation is advantageous over other film formation methods in that a metal film can be formed in a dry process at a relatively high rate and with relative ease. With respect to vacuum evaporated metal thin film type. magnetic recording media, various proposals for improvement have been made, e.g., in U.S. Pat. Nos. 3,342,632 and 3,342,633.

An outstanding problem waiting for a solution in putting ferromagnetic metal thin film type magnetic recording media to practical use is running properties and durability. That is, a magnetic recording medium is demanded not only to be durable but to run stably and smoothly while sliding at a high speed with a magnetic head for recording, reproduction and erasion.

However, the ferromagnetic metal thin film type recording tapes involve difficulty in maintaining running durability as compared with coated type magnetic tapes. This is because the coated type magnetic recording tapes contain a lubricant in the magnetic layer and therefore maintain surface lubrication for an extended period of time whereas metal thin film type magnetic recording media have a lubricant layer on their surface and, once the lubricant falls off, the magnetic layer is ready to be damaged.

In order to satisfy running durability of the ferromagnetic metal thin film type media, it has been proposed to form a protective or lubricant layer comprising a thermoplastic resin, a thermosetting resin, a fatty acid, a fatty acid metal salt, a fatty acid ester, or an alkyl phosphate on the surface of a magnetic-layer as disclosed in JP-A-60-69824 and JP-A-60-85427 (the term "JP-A" as used herein means an "unexamined published Japanese patent application").

Use of a fluorine-containing compound as a protective material has also been proposed in various modifications. For example, JP-A-61-107528 discloses use of a compound containing a branched perfluoroalkenyl group for improvement in durability; U.S. Pat. No. 3,778,308 discloses use of a perfluoroalkyl polyether type compound; and JP-B-60-10368 (the term "JP-B" as used herein means an "examined published Japanese patent application") discloses as a protective compound a perfluoroalkyl polyether with one or both of its terminals modified with a polar group such as a carboxyl group. Further, Sugiyama, et al. report their study on the use of a multi-chain perfluoroalkyl polyether amide which is obtained by dehydrating condensation of a compound having a plurality of amino groups and a carboxylic acid having a perfluoroalkyl polyether chain as a lubricant for a ferromagnetic metal thin film type magnetic recording disc (see Abstract B-28 of the 34th National Conference of Japan Lubrication Society, p 425).

JP-A-64-33713, JP-A-1-112516, JP-A-3-102614, JP-A-1-112528, and JP-A-62-192029 disclose that compounds having a polar group such as isocyanate compounds and oxo acids, improve running durability.

JP-A-3-207021 discloses that durability at a still mode is improved by vacuum depositing a polar group-containing lubricant on a metallic film and then applying thereon a liquid lubricant having weaker polarity than that of the polar group-containing lubricant.

JP-A-63-237216 discloses improvement of durability chiefly of a plated magnetic layer of a magnetic disc against a magnetic head by coating a perfluoropolyether on a protective film comprising a hydrophilic group-containing fluorine compound.

JP-A-61-113126 discloses a metal thin film type magnetic recording medium which is freed of tape squeaks on running or clogging of a magnetic head by providing a layer containing both a polar group-containing perfluoropolyether and a perfluoropolyether containing no polar group on a magnetic layer.

JP-A-4-76816 discloses to improve running properties and durability of a metal thin film type magnetic recording medium by using a combination of a lubricant having a viscosity of not more than 30 cSt and a lubricant having a viscosity of not less than 30 cSt.

Summarizing the above-mentioned prior art, in a magnetic recording medium comprising a weakly polar perfluoropolyether alone as a lubricant is apt to be easily released during running, while a magnetic recording medium comprising a polar group-containing perfluoropolyether alone as a lubricant is short of fluid lubrication and therefore insufficient for still durability or frequently causes clogging attributable to a non-adsorbed lubricant. Accordingly, many of conventional techniques aim at elimination of these disadvantages by using a polar group-containing perfluoropolyether in combination with a perfluoropolyether with little polarity.

From this viewpoint, among the so far proposed lubrication techniques, the techniques disclosed in JP-A-63-237216 and JP-A-3-207021 are deemed to furnish a fairly satisfactory system for improving running durability.

Nevertheless, the technique of JP-A-63-237216 is confined to application on a protective layer. Besides, the expected effects are not manifested in some cases unless the coating conditions are properly selected. The lubrication technique of JP-A-3-207021 involves vacuum evaporation needing a complicated step, and widening of a non-magnetic support meets difficulty in controlling the evaporation deposit thickness.

On the other hand, where the lubricants are coated on a ferromagnetic metal thin film, the running durability of the resulting magnetic layer is influenced by the adsorption (concentration of adsorbate) and degree of adhesion of the lubricant, which factors are also associated with the surface condition of the metal thin film. In this connection, a number of surface treatments for improving surface properties of a ferromagnetic metal thin film have been proposed. Such surface treatments include (1) application of a steam stream heated at 100° C. or higher onto the surface of a ferromagnetic metal thin film to form a protective layer for improving corrosion resistance (JP-A-57-123533), (2) heat treatment of a magnetic metal thin film in contact with water to form an anticorrosive protective layer (JP-A-57-138053), (3) exposure of a ferromagnetic metal thin film to a glow discharge in a water- and nitrogen-containing atmosphere to form an anticorrosive and durable oxide layer (JP-A-59-119542), (4) exposure of a ferromagnetic metal thin film to a glow discharge in a water- and argon-containing atmosphere to form an anticorrosive and durable oxide layer (JP-A-59-119543), (5) heat treatment of a magnetic metal layer in roll form in an oxygen- and water-containing atmosphere to form an anticorrosive and durable uniform oxide layer (JP-A-63-9021), (6) firing the surface of a ferromagnetic metal thin film mainly comprising cobalt at a temperature of 200° to 290° C. to form a cobalt oxide layer which has excellent abrasion resistance and on which a lubricant (exemplified by silicone oil and polymers) can be fixed (JP-B-49-29445), (7) treatment of a magnetic metal thin film layer in water or an aqueous solution containing a surfactant and an organic solvent to improve weather resistance (JP-A-59-2231), (8) treatment of a ferromagnetic metal thin film with an alcohol containing 10 to 80% by weight of water followed by formation of a layer comprising an organic compound to improve durability and weather resistance (JP-A-63-229620), and (9) heat treatment of a ferromagnetic metal thin film in the presence of oxygen and water to improve abrasion resistance (recommended treating conditions are 40° C., 40% RH to 90° C., 15% RH, and a recommended lubricant is a perfluoropolyether) (JP-A-62-287426).

Of these known surface treatments, the techniques (1) to (5), (7) and (9) consist of formation of a protective layer, such as an oxide layer, by combining a heat treatment or a glow discharge treatment and a contact treatment with at least water, and the technique (6) consists of formation of a cobalt oxide layer by heating. The technique (8) employs a surface treatment with a mixed solution of water and an organic solvent. The former techniques (i.e., (1) to (6), (7) and (9)) are attended by a problem that the surface treatment sometimes results in a reduction in strength of the magnetic layer, making it brittle and deteriorating durability. In the latter technique (i.e., (8)), the organic solvent used is adsorbed on the surface of the magnetic layer to interfere with adsorption of a lubricant onto the magnetic layer, sometimes resulting in clogging.

That is, none of the known techniques proposed to date has afforded an effective solution to the above-described problems.

SUMMARY OF THE INVENTION

An object of the present invention is to provide a ferromagnetic metal thin film type magnetic recording medium which has improved running durability, especially a low coefficient of friction and durability at a still mode, and causes no clogging of a magnetic head while retaining satisfactory electromagnetic conversion characteristics.

Another object of the present invention is to provide a process for producing the above-mentioned magnetic recording medium with ease and at low cost.

These and other objects of the present invention are accomplished by (1) a process for producing a magnetic recording medium comprising subjecting a ferromagnetic metal thin film formed on a non-magnetic support by vacuum film formation to a high humidity treatment in an atmosphere of from 50 to 90% RH (relative humidity) at a temperature of from 10° to 50° C. and then applying a lubricant having a polar group in the molecule thereof (hereinafter referred to as a polar lubricant) to the thus treated ferromagnetic metal thin film; and (2) a magnetic recording medium comprising a non-magnetic support having thereon a ferromagnetic metal thin film, wherein the ferromagnetic metal thin film has provided thereon a double lubricant layer comprising (i) a lower layer comprising a polar group-containing perfluoropolyether (hereinafter referred to as polar PFPE) and (ii) an upper layer comprising a perfluoropolyether having no polar group (hereinafter referred to as non-polar PFPE), the polar PFPE has a viscosity of from 200 to 1000 cSt at room temperature and the non-polar PEPE has a viscosity of 50 cSt or less at room temperature.

DETAILED DESCRIPTION OF THE INVENTION

Where a lubricant layer comprising a polar lubricant is formed on a magnetic layer, the present inventors revealed by experiments that the adsorption of the lubricant and occurrence of clogging on long-term running on a VTR largely vary depending on the surface conditions of the magnetic layer even with the spread of the lubricant being fixed. Therefore, it is necessary to stabilize the surface properties of a magnetic layer before application of a lubricant.

According to the present invention in which a magnetic film is exposed to a specific high humidity atmosphere, and a polar lubricant is then applied thereon, the magnetic film exhibits strong adsorptivity for the polar lubricant to provide a uniform lubricant layer having a high adsorption.

Since the magnetic layer surface treatment according to the present invention exerts its effect only on the surface of a magnetic layer, it does not cause deterioration of corrosion resistance or impairment of electromagnetic conversion characteristics. Further, because no solvent is used, sites for adsorption of a lubricant applied are never be obstructed.

The high humidity treatment of a ferromagnetic metal thin film is carried out at a relative humidity (RH) of from 50 to 90%, preferably from 55 to 85%, and more preferably from 60 to 80%, at a temperature of from 10° to 50° C., and preferably from 20° to 40° C. A practical RH is chosen so as not to cause moisture condensation on the surface of the magnetic layer. A treating time of several seconds would be sufficient. As long as no moisture condensation takes place, a longer treating time may be employed. A treating time is preferably from 10 to 30 seconds. The treatment may or may not be followed by drying.

In carrying out the high humidity treatment, a non-magnetic support with a magnetic layer is left to stand in a chamber kept at a given humidity. If it is wound up in roll form, it is re-wound in that chamber. Note that, where a high humidity treatment immediately after formation of a magnetic layer should be avoided or where other treatments, such as correction of cupping, are needed, it is necessary to keep the magnetic layer from a high humidity environment.

The thus treated surface has a contact angle of 45° or less, preferably of from 30° to 35°, with water, and 25° or more, preferably of from 30° to 40°, with methylene iodide.

The treated ferromagnetic metal thin film should be preserved in such a manner that the surface structure may be maintained at least until the formation of a lubricant layer. It is unfavorable to put the treated metal thin film under an environment or treatment which would cause deterioration of the surface structure. For example, the treated metal layer may be preserved in vacuo without any problem. In general, it is desirable to form a lubricant layer on the metal thin film within a few hours from the high humidity treatment before the magnetic layer undergoes excessive oxidation.

Further, an arbitrary treatment may be given in principle to at least a part of the surface of a ferromagnetic metal thin film as far as such a treated metal thin film is still capable of forming the above-mentioned surface structure by the high humidity treatment.

The mechanism of action of the high humidity treatment according to the present invention seems to be as follows. On bringing a ferromagnetic metal thin film layer into contact with water molecules in the high humidity treatment, it appears that a layer which has activity and high affinity for the polar group of a polar lubricant is formed so that the adsorption of the polar lubricant may be ensured. It is assumed that the layer having activity and high affinity for the polar group of a lubricant consists of a water film physically adsorbed on a thin oxide layer of the magnetic film.

Employing a markedly milder temperature condition than those in the conventional surface treatments, the high humidity treatment of the present invention only results in modification of the surface structure of the ferromagnetic metal thin film without forming a protective layer of a certain thickness as in the conventional surface treatments, and by such surface modification the interaction with a polar lubricant is enhanced.

It was confirmed that a protective layer of a certain thickness formed in the presence of water and oxygen by the conventional techniques, when applied to the present invention, rather deteriorates the quality of the ferromagnetic metal thin film or makes the film brittle, ultimately resulting in a reduction in durability.

The high humidity treatment of the present invention which modifies the surface of a ferromagnetic metal thin film produces an effect of increasing the adsorptivity of the film for a polar lubricant.

That is, because a polar lubricant essentially has affinity for a metal owing to its polar group, the bonding of the lubricant to a ferromagnetic metal thin film is made more firm by the above-mentioned surface modification to form a stable lubricant layer. Moreover, the molecules of the lubricant are oriented with the polar groups facing the ferromagnetic metal thin film and the main chain or non-polar sides facing outside, thereby forming a stable boundary lubrication film by which clogging of a head can effectively be reduced.

The polar lubricant which can be coated on the treated ferromagnetic metal thin film includes organic acids such as a stearic acid, a palmitic acid, and a myristic acid; and fluorine-containing organic acids derived from the above-mentioned organic acids by displacing a part or the whole of the hydrogen atoms other than those in the polar groups with fluorine.

The coated amount of a polar lubricant to be applied on the treated ferromagnetic metal thin film is generally in the range of from 4 to 30 mg/m$^2$, preferably from 10 to 30 mg/m$^2$, and more preferably from 15 to 20 mg/m$^2$, and a suitable weight ratio of coated amount to saturation adsorption amount is in the range of from 1/1 to 2/1.

A polar group-containing perfluoropolyether (PEPE) is preferred as a polar lubricant.

The coated amount as referred to herein is obtained by determination of fluorine on the coated sample by X-ray fluorometry with "SXF-1000" manufactured by Shimadzu Corporation.

If the amount of the polar lubricant applied on the ferromagnetic metal thin film is too small, the amount of a non-polar lubricant which can be applied thereon would also be small, and both polar lubricant layer and non-polar lubricant layer fail to fully show the respective function. If it is too large, the coefficient of friction especially on low-speed running increases, tending to cause sticking.

The polar lubricant may be used either alone or in combination with a lubricant containing no polar group (hereinafter referred to as a non-polar lubricant). In the latter case, the combined lubricants may be present in a single layer, or each of them may form an independent layer to provide a double lubricant layer.

In particular, remarkable effects can be obtained with a double lubricant layer composed of a lower layer (on the side of a ferromagnetic metal thin film layer) comprising a polar lubricant and an upper layer comprising a non-polar lubricant. This is because a non-polar lubricant behaves freely without being trapped by the ferromagnetic metal thin film so that it serves for fluid lubrication unlike the boundary lubrication by the molecular orientation of a polar lubricant.

A perfluoropolyether (PFPE) is a preferred non-polar lubricant which may be used in combination with polar lubricants. PFPE having the main structure of the PFPE described below may be used. PFPE species having a lower viscosity than that of the polar PFPE are preferred.

Where a lubricant layer has a double layer structure in which the upper and lower layers both contain the basic skeleton of PFPE, the added amount of the PFPE can be increased probably by the action of affinity between the two layers, which leads to an improved lubricating effect.

Of the applicable polar lubricants, a polar PFPE is particularly preferred because it has a high viscosity and contains a polar group showing good affinity for a metal and forms a stable protective layer firmly bonded to the surface of the ferromagnetic metal thin film (hereinafter referred to as a magnetic layer or a magnetic film). In addition, it is oriented with its polar group facing to the ferromagnetic metal thin film and its main chain or non-polar site facing to the opposite side of the ferromagnetic metal thin film to form a stable boundary lubrication film.

Deferring from a polar PFPE which serves for boundary lubrication by molecular orientation, a non-polar PFPE containing no polar group behaves freely without being trapped by the ferromagnetic metal thin film so that it serves for fluid lubrication.

Since the upper and lower layers both comprises the basic skeleton of PFPE in the magnetic recording medium of the present invention, the added amount of the non-polar PFPE can be increased probably by the action of some affinity, leading to an improved lubricating effect.

The double lubricant layer separately comprising a polar PFPE and a non-polar PFPE is more effective than a single lubricant layer containing both a polar PFPE and a non-polar PFPE probably because the adsorption of the polar PFPE on the magnetic layer is not hindered by the non-polar PFPE.

In preparing the magnetic recording medium of the present invention, the adsorptivity of a ferromagnetic metal thin film for the polar PFPE can be enhanced by modifying the surface of the ferromagnetic metal thin film by a high humidity treatment.

Since the polar PFPE to be used in the double lubricant layer has an increased viscosity while the non-polar PFPE has a reduced viscosity, the magnetic recording medium with such a double lubricant layer has a small coefficient of friction and excellent still durability. Further, it was found for the first time that the above-described double lubricant layer effectively reduces clogging of a head.

The double lubricant layer comprising a polar PFPE layer and a non-polar PFPE layer allows the respective PFPE to manifest its own function to the full. That is, the polar PFPE which is firmly adsorbed on the surface of a magnetic layer with molecular orientation acts for boundary lubrication, while the non-polar PFPE as an outermost layer acts for fluid lubrication. Besides, the non-polar PFPE in the upper layer has affinity for the lower layer comprising the polar PFPE so that it is hardly released or volatilized as compared with the case where it is present alone on the surface of a magnetic layer. Accordingly, the non-polar PFPE may have a low viscosity which is advantageous as a fluid lubricant, thus exhibiting a great effect in preventing head clogging.

The polar PFPE which can be used in the lower layer has a viscosity of from 200 to 1000 cSt (centistokes), preferably from 200 to 600 cSt, and more preferably from 200 to 400 cSt, at room temperature (about 20° C.). While not limiting, the molecular weight of the polar PFPE is generally selected from 1000 to 5000, and preferably from 1000 to 3000.

The non-polar PFPE which can be used in the upper layer has a viscosity of 50 cSt or less, and preferably of from 30 to 50 cSt, at room temperature (about 20° C). While not limiting, the molecular weight of the non-polar PFPE is generally selected from 1500 to 5000, and preferably from 1500 to 3000.

The viscosity (cSt) of the polar or non-polar PFPE can be measured with an E type viscometer manufactured by Tokyo Keiki Co., Ltd.

The non-polar PFPE to be used in the present invention is not particularly limited as long as it has a chemical structure of a general perfluoropolyether and includes those in which the most part (e.g., 50% or more) of the hydrogen atoms of a polyether moiety are displaced with fluorine.

The polar PFPE is a PFPE having the skeleton of the above-mentioned non-polar PFPE having introduced therein a polar group.

The main chain of the non-polar PEPE preferably contains from 6 to 150 carbon atoms, and more preferably from 9 to 50.

Specific examples of the non-polar PFPE include perfluoro-n-propylene oxide polymers [$(CF_2CF_2CF_2O)_n$; n represents a number of from 4 to 20], perfluoroisopropylene oxide polymers [$(CF(CF_3)CF_2O)_n$; n represents a number of from 4 to 20], perfluoroethylene oxide polymers [$(CF_2CF_2O)_n$; n represents a number of from 4 to 20], perfluoromethylene oxide polymers [$(CF_2O)_n$; n represents a number of from 8 to 40], and copolymers thereof, such as perfluoroisopropylene oxide-perfluoro methylene oxide copolymers [$(CF(CF_3)CF_2O)_n$—$(CF_2O)_m$; n and m represents a number of from 4 to 20 and from 8 to 40, respectively] and perfluoroethylene oxide-perfluoromethylene oxide copolymers [$(CF_2CF_2O)_n$—$(CF_2O)_m$; n and m represents a number of from 4 to 20 and from 8 to 40, respectively].

The molecular ends of the non-polar PFPE are preferably selected from any of a trifluoromethyl group, a difluoromethyl group, a monofluoromethyl group, and a methyl group.

The above-described structure of the non-polar PFPE also applies to the polar PFPE.

The polar group in the polar PFPE is not particularly limited, but includes, for example, an oxo acid group, a sulfon group (i.e., —$SO_2$—), a sulfoxide group (i.e., —SO—), a diphenyl ether group (e.g.,  ), an epoxy group, an alcoholic hydroxyl group, an ester group, an alkene group, a heterocyclic group, and a salt thereof. Further, examples of the polar PEPE include silane coupling compounds having a PEPE and chelating compounds having a PEPE. Preferred of them are an oxo acid group, a sulfon group, a sulfoxide group, and a diphenyl ether group, with an oxo acid group being particularly preferred.

The terminology "oxo acids" as used herein means compounds in which all the atoms bonded to the central atom are oxygen with hydrogen being bonded to a part or the whole of the oxygen atoms to form a hydroxyl group, the hydrogen of which produces a hydrogen ion in an aqueous solution to display the character of acids (see RIKAGAKU JITEN, published by Iwanami Shoten Co., Ltd.). Compounds in which a carbon atom is bonded to the central atom, such as carboxylic acids and sulfonic acids, are included under oxo acid derivatives. The terminology "oxo acid group" as used herein includes not only an oxo acid group but a group of an oxo acid derivative, e.g., a carboxyl group, and an oxo acid ester group such as a sulfuric ester group.

The position and the number of polar groups in polar PFPE molecules are not particularly limited.

The polar group may be bonded to the main chain, perfluoropolyether, via some other molecular chain, such as an amide, benzene or alkylene.

The main chain, perfluoropolyether, of the polar-PEPE preferably contains from 6 to 150 carbon atoms, and more preferably from 9 to 50. Examples of such main chains are $(CF_2CF_2CF_2O)_n$ (n represents a number of from 4 to 20), $(CF(CF_3)CF_2O)_n$ (n represents a number of from 4 to 20), $(CF_2CF_2O)_n$ (n represents a number of from 4 to 20), $(CF_2O)_n$ (n represents a number of 8 to 40); and combinations thereof, such as $(CF(CF_3)CF_2O)_n$—$(CF_2O)_m$ and $(CF_2CF_2O)_n$—$(CF_2O)_m$ (n and m represent a number of from 4 to 20 and from 8 to 40, respectively).

If the carbon atom number is too small, the above-mentioned condition cannot be satisfied, and running troubles may result. If it is too large, the molecular mobility becomes large and, as a result, the molecules hinder each other from being adsorbed. The influence of the mobility is apt to become large on coating because the polar PFPE should be coated on the magnetic layer in a short time, possibly resulting in a failure of imparting sufficient durability.

With the above conditions being met, the polar PFPE is sufficiently adsorbed on a ferromagnetic metal thin film. A saturation adsorbed amount for covering the entire surface of a ferromagnetic metal thin film with a monomolecular layer is 4 mg/m² or more. The adsorbed amount can be obtained from an adsorption isotherm at 25° C. prepared by using a fluorine solvent (e.g., "FOMBLIN ZS 100" produced by Montefluos Co., Ltd.) used for coating a polar PFPE.

orientation would be irregular, which is undesirable for forming a non-polar PFPE layer thereon. The branched structure has preferably from 0 to 2 carbon atoms.

Specific but non-limiting examples of the polar PFPE are shown below.

Polar PFPE with Oxo acid group:

(Compound 1):

("KRYTOX 157FSL" produced by E.I. Du Pont de Nemours & Company (Inc.))

(Compound 2):
F(CF$_2$CF$_2$CF$_2$O)$_{22}$CH$_2$CH$_2$COOH (Compound 3):
HOOCCF$_2$(OC$_2$F$_4$)$_{10}$(OCF$_2$)$_{10}$CF$_2$COOH (Compound 4):

(Compound 5):

Polar PFPE with Sulfo, Sulfoxide or Diphenyl Ether Group:

(Compound 6):

(Compound 7):

(Compound 8):

The molecular chain of the polar PFPE may have a straight chain structure or may contain a branched structure. If the branched molecular chain has too large a size, it occupies a large proportion in the molecular space and fails to form a dense protective layer. Further, the molecular Compounds 1 to 3 are commercially sold by E.I. Du Pont de Nemours & Company (Inc.), Daikin Industries, Ltd., and Montefluos Co., Ltd., respectively.

As long as the coated amount of the polar lubricant such as polar PFPE falls within the above range, a non-polar PFPE can be retained thereon in a sufficiently large amount so that the coated amount of the non-polar PFPE may be in the range of from 1.0 to 10 mg/m$^2$, and preferably from 2 to 5 mg/m$^2$.

While the polar PFPE or non-polar PFPE is basically used alone in the respective layer, other lubricants may be used in combination as far as the effects of the present invention are not impaired.

If desired, the polar lubricant may further be combined with other lubricants as long as the effects of the present invention are not lessened. Usable other lubricants include metallic soaps; fatty acid amides; fatty acid esters; higher aliphatic alcohols; monoalkyl phosphates; dialkyl phosphates; trialkyl phosphates; paraffins; silicone oils; animal or vegetable oils; mineral oils; higher aliphatic amines; inorganic fine powders such as graphite, silica, molybdenum disulfide, and tungsten disulfide; resin fine powders such as polyethylene, polypropylene, polyvinyl chloride, an ethylenevinyl chloride copolymer, and polytetrafluoroethylene; α-olefin polymers; and unsaturated aliphatic hydrocarbons which are liquid at room temperature.

Formation of a lubricant layer on the high humidity-treated ferromagnetic metal thin film is carried out by a method comprising coating or spraying a solution of a lubricant (e.g., a polar lubricant) in an organic solvent onto a substrate (e.g., a non-magnetic support having thereon a high humidity-treated ferromagnetic metal thin film) and drying, a method comprising rubbing a substrate with an Object impregnated with a lubricant to transfer the lubricant thereto, a method comprising immersing a substrate in a solution of a lubricant in an organic solvent to let the lubricant be adsorbed on the substrate, and a method of forming a monomolecular film of a lubricant by a Langmuir-Blodgett method.

A lubricant layer is preferably formed by dip coating, coil bar coating or gravure coating followed by drying. Where a double lubricant layer is to be formed, the solvent for coating is preferably selected from those capable of dissolving both the lubricants of the upper and lower layers so as to prevent unevenness of coating of the upper layer and to remove the excess polar lubricant of the lower layer while coating the upper layer. For example, a fluorine solvent is preferred for a double lubricant layer composed of a polar PFPE as a lower layer and a non-polar PFPE as an upper layer. Examples of suitable fluorine solvents are described in JP-A-4-119532.

In order to accelerate adsorption, after drying the lower lubricant layer and before coating the upper lubricant layer, the lower lubricant layer is preferably allowed to stand at room temperature and under atmospheric pressure for at least 1 hour, preferably at least 5 hours. If the upper lubricant layer is coated immediately after formation of the lower lubricant layer, sufficient effects of the present invention cannot be obtained because the polar PFPE immediately after being coated is not sufficiently adsorbed on the magnetic layer due to the mixed adsorption with the solvent. A solution of a non-polar PFPE is then coated and dried in the same manner as for the lower lubricant layer to form an upper lubricant layer.

The solvent for coating the polar PFPE is not particularly limited. The solvent for coating the non-polar PFPE is preferably selected from those capable of dissolving both the polar PFPE and the non-polar PFPE, such as fluorine solvents, so as to prevent unevenness of coating of the upper layer and to remove the excess polar PFPE of the lower layer while coating the upper layer.

As compared with a lubricant layer containing both a polar PFPE and a non-polar PFPE, the steric hindrance of the non-polar PFPE can be eliminated in the double lubricant layer. As a result, the adsorption of the polar PFPE can be increased and, at the same time, the amount of the unadsorbed polar PFPE present on the outermost surface of a magnetic recording medium can be decreased, by which occurrence of clogging can be reduced. In addition, formation of a lubricant layer can be performed in a stable manner by using a conventional coating apparatus without requiring introduction of new equipment.

If desired, the ferromagnetic metal thin film may be subjected to a surface treatment, such as UV irradiation, a glow discharge treatment, or a plasma treatment, before the high humidity treatment in order to improve adhesion of a lubricant layer.

Formation of the lubricant layer according to the present invention can be performed in a stable manner by using a conventional coating apparatus without requiring introduction of new equipment.

If desired, the ferromagnetic metal thin film may be subjected to a surface treatment, such as UV irradiation, a glow discharge treatment, or a plasma treatment, before the high humidity treatment in order to improve adhesion to a lubricant layer.

After the above-mentioned high humidity treatment, a lower lubricant layer comprising a polar PFPE is formed. Accordingly, as long as the formation of the lower lubricant layer is directly preceded by the high humidity treatment, the ferromagnetic metal thin film may be subjected to any arbitrary treatment before the high humidity treatment. Preferred treatments which may be conducted before the high humidity treatment include formation of a rust inhibiting layer, a heat treatment, and an inert gas treatment.

Formation of a rust inhibiting layer is carried out by coating a solution containing a known rust inhibitor, such as benzotriazole, benzimidazole or a derivative thereof, on a ferromagnetic metal thin film which has been formed by vacuum deposition of a metal, particularly a metal mainly comprising cobalt, on a non-magnetic support in an oxygen-containing atmosphere. Even where a rust inhibiting layer is provided on a ferromagnetic metal thin film, the adsorption of a polar lubricant is not greatly reduced as compared with that applied on a ferromagnetic metal thin film having no rust inhibiting layer because the polar site of the rust inhibitor and the polar lubricant interact on each other.

The heat treatment is carried out by heating a ferromagnetic metal thin film, which has been formed by vacuum deposition of a metal, particularly a metal mainly comprising cobalt, on a non-magnetic support in an oxygen-containing atmosphere, at a temperature of from 80 to 180° C for a period of from 1 to 60 seconds.

The inert gas treatment is carried out by maintaining a ferromagnetic metal thin film, which has been formed by vacuum deposition of a metal, particularly a metal mainly comprising cobalt, on a non-magnetic support in an oxygen-containing atmosphere, in an inert gas atmosphere.

Materials of a ferromagnetic metal thin film which can be used in the present invention include ferromagnetic metals such as iron, cobalt, and nickel, and ferromagnetic alloys such as Fe—Co, Fe—Ni, Co—Ni, Fe—Rh, Co—P, Co—B, Co—Y, Co—La, Co—Ce, Co—Pt, Co—Sm, Co—Mn, Co—Cr, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W, and Co—Ni—Re. Among them, preferred are cobalt, Co—Ni, and Co—Fe. The thickness of the ferromagnetic metal thin film is from 0.02 to 2 μm, and preferably from 0.05 to 1.0 μm.

A ferromagnetic metal thin film may further contain other elements such as 0, N, Cr, Ga, As, Sr, Zr, Nb, Mo, Rh, Pd, Sn, Sb, Te, Pm, Re, Os, Ir, Au, Hg, Pb, Mg, and Bi.

A ferromagnetic metal thin film is formed on a non-magnetic support by vacuum film formation, such as vacuum evaporation and sputtering. In order to incorporate a prescribed amount of oxygen into a ferromagnetic metal thin film, oxygen is simultaneously introduced into a film forming vacuum chamber.

The oxygen content in a ferromagnetic metal thin film can be calculated by Auger electron spectroscopy (AES) depth analysis. When a ferromagnetic metal thin film contains 15 atom % or more, and preferably from 20 to 45 atom %, of oxygen, the saturation adsorption of a polar lubricant is increased, and adsorption of a polar lubricant is enhanced, making an effective contribution to accomplishment of the objects of the present invention. If the oxygen content exceeds 45 atom %, the increased proportion of non-magnetic components leads to loss of the characteristics of the ferromagnetic metal such as high electromagnetic conversion characteristics.

It is preferable that the oxygen is distributed in the thickness direction so that the oxygen content in the vicinities of a non-magnetic support and in the vicinities of the surface of a magnetic layer may be higher than that in the central portion. Specifically, a ferromagnetic metal thin film being divided into 5 equal portions in its thickness direction by AES depth analysis, it is preferable that the total oxygen content in the central three-fifths is lower than that each of the upper one-fifth and the lower one-fifth, i.e., the portion in the vicinities of the surface of a magnetic layer and the portion in the vicinities of a non-magnetic support. More specifically, the oxygen content in each of the upper and lower portions is preferably 5 atom % or more, more preferably 5 to 25 atom %, and that in the central 3 portions is preferably from 3 to 4 atom %.

Crystal structures of the ferromagnetic metal in the magnetic layer include hexagonal systems and rhombic prisms. The rhombic prisms include those in which crystal prisms obliquely overlap each other like scales to form a pinecorn shape.

The magnetic layer may be composed of plural layers which have the same composition but differ in crystal structure or which have the same crystal structure but differ in orientation and/or plural layers which differ from composition and may have the same or different crystal form. For example, a magnetic layer composed of two layers which have the same composition and the same crystal form with their directions of the inclination of rhombic prisms being reversely crossing is advantageous for reducing the variation in electromagnetic conversion characteristics and durability depending on the running direction or for reducing noise.

In the case of constructing a magnetic layer by rhombic prisms in vacuum film formation, vacuum evaporation can be carried out by, for example, using an electron beam of 30 keV as a heating source, setting the degree of vacuum of a vacuum chamber at $1\times10^{-4}$ Torr or less, introducing oxygen gas into the vacuum chamber while maintaining the inner pressure at $1\times10^{-3}$ Torr or less, and obliquely depositing a ferromagnetic metal on a non-magnetic support placed in the chamber at an angle of incidence of from 0° to 50°.

The ferromagnetic metal thin film preferably has a thickness of from 500 Å to 3000 Å.

In order to increase adhesion of a ferromagnetic metal thin film to a non-magnetic support, a subbing layer may be provided therebetween.

For the purpose of imparting a specific characteristic to a ferromagnetic metal thin film, a non-magnetic intermediate layer independent of a subbing layer may also be provided in the ferromagnetic metal thin film and/or between the ferromagnetic metal thin film and a non-magnetic support. For example, a non-magnetic intermediate layer containing a lubricant which is also used in the above-described lubricant layer may be provided to make lubricity control more certain or to further improve dynamic characteristics of the magnetic layer.

The non-magnetic intermediate layer includes a layer comprising a metal or a metal oxide, a layer comprising a resin and/or an organic or inorganic filler, and the like. The non-magnetic intermediate layer has a thickness usually of from 20 to 500 Å, and preferably from 50 to 200 Å.

Non-magnetic supports which can be used in the present invention include films or sheets made of plastics such as polyethylene terephthalate, polyimide, polyamide, polyvinyl chloride, cellulose triacetate, polycarbonate, polyethylene naphthalate, and polyphenylene sulfide; or aluminum, titanium or stainless steel.

In order to improve running durability of the magnetic recording medium of the present invention, it is effective to provide fine projections on a non-magnetic support before a ferromagnetic metal thin film is formed thereon, which eventually results in provision of moderate unevenness on the surface of a magnetic layer. The fine projections on the surface of a non-magnetic support preferably have a density of from $2\times10^6$ to $2\times10^8$ per mm$^2$ and a height of from 1 to 50 nm.

The thickness of a non-magnetic support is usually from 3 to 50 μm, and preferably from 3 to 12 μm, though varying depending on the final use.

The running properties may also be improved by providing a back coating layer comprising a fine powder of carbon black and the like, and a binder resin on a non-magnetic support on the side opposite to a ferromagnetic metal thin film.

The magnetic recording medium according to the present invention may have any shape, such as tapes, sheets, cards, and discs. Tapes and discs are particularly preferred.

Figure 1:
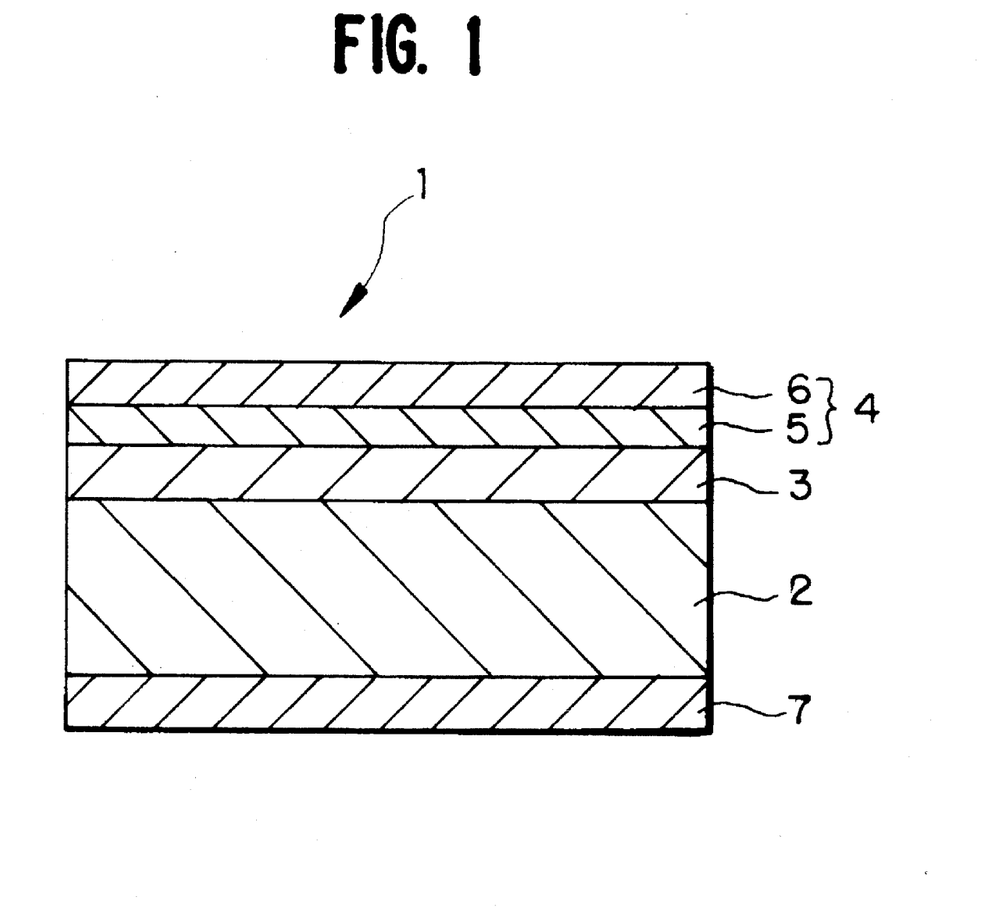
FIG. 1 is a schematic cross section of a magnetic recording medium according to one embodiment of the present invention.

In FIG. 1 is shown a preferred embodiment of the magnetic recording medium of the present invention, in which the numeral (1) indicates a magnetic recording medium of the present invention; (2) indicates a non-magnetic support; (3) a ferromagnetic metal thin film; (4) a lubricant layer comprising upper layer (5) comprising a polar PFPE and lower layer (6) comprising a non-polar PFPE; and (7) a back coating layer.

Non-magnetic support (2) is not particularly limited, but is preferably polyethylene terephthalate, polyethylene naphthalate, polyimide, and polyamide having a thickness of from 3 to 12 μm.

Ferromagnetic metal thin film (3) is preferably a Co—Ni, Co, Co—Fe metal thin film formed by vacuum evaporation in an oxygen-containing atmosphere using a continuous roll coating system for vacuum evaporation. A layer structure of ferromagnetic metal thin film (3) is not particularly limited, but examples thereof includes a single layer, a plural layer comprising magnetic layers, and a plural layer comprising magnetic layers and non-magnetic layers.

In lower layer (5) comprising a polar PEPE, the polar PEPE has a polar group at least one molecular end thereof, and the polar group is preferably a carboxyl, sulfon, oxo acid, sulfoxide, or diphenyl ether group.

In upper layer (6) comprising a non-polar PEPE, the non-polar PEPE has no polar group at molecular ends thereof, and the ends are preferably trifluoromethyl, difluoromethyl, monofluoromethyl, and methyl groups. Preferably, the non-polar PEPE is liquid at room temperature, and has a viscosity of 50 cSt or less at 20° C.

Back coating layer (7) is used in general, and is not particularly limited.

The present invention is now illustrated in greater detail with reference to Examples in view of Comparative Examples.

EXAMPLE 1-1

On a 10 μm thick polyethylene terephthalate film having fine projections of silica particles (particle size: 250 Å; projection density: $9 \times 10^6/mm^2$) and mat structures on the surface thereof was deposited a Co—Ni (80/20) alloy by oblique vacuum evaporation by means of a continuous roll coating system for vacuum evaporation while introducing oxygen gas in the vacuum chamber to form a magnetic layer having a thickness of 2000 Å.

A 0.44% by weight solution of a polar PFPE having a viscosity of 400 cSt at 20° C. ("KRYTOX 157FSL" produced by E.I. Du Pont de Nemours & Company (Inc.); polar group: carboxyl group) in a fluorine solvent ("FOMBlIN ZS 100" produced by Montefluos Co., Ltd.) was coated on the magnetic layer With a coil bar and dried to form a lower lubricant layer, and the coated film was wound up. After 6 hours from the coating of the lower layer, a 0.11% by weight solution of the following non-polar PFPE having a viscosity of 40 cSt at 20° C. ("KRYTOX 143AZ" produced by E.I. Du Pont de Nemours & Company (Inc.); number mean molecular weight: 1850 (NMR)) in a fluorine solvent (FOMBLIN ZS 100) was further coated thereon and dried to form an upper lubricant layer. A back coating layer was coated on the back side of the substrate. The resulting coated film was cut to a width of 8 mm to obtain a magnetic recording tape.

Non-polar PFPE:

COMPARATIVE EXAMPLE 1-1

A magnetic recording tape was prepared in the same manner as in Example 1-1, except for replacing the double lubricant layer with a single lubricant layer formed by coating a mixed FOMBLIN ZS 100 solution containing KRYTOX 157FSL and KRYTOX 143AZ in a concentration of 0.44% by weight and 0.11% by weight, respectively.

COMPARATIVE EXAMPLE 1-2

A magnetic recording tape was prepared in the same manner as in Example 1-1, except for replacing KRYTOX 157FSL with a polar PFPE having the same skeleton as KRYTOX 157FSL and a viscosity of 1100 cSt at 20° C. ("KRYTOX 157FSH" produced by E.I. Du Pont de Nemours & Company (Inc.).; polar group: carboxyl group).

COMPARATIVE EXAMPLE 1-3

A magnetic recording tape was prepared in the same manner as in Example 1-1, except for replacing KRYTOX 157FSL with a polar PFPE having the same skeleton as KRYTOX 157FSL and a viscosity of 1800 cSt at 20° C. ("KRYTOX 157FSH" produced by E.I. Du Pont de Nemours & Company (Inc.).; polar group: carboxyl group).

COMPARATIVE EXAMPLE 1-4

A magnetic recording tape was prepared in the same manner as in Example 1-1, except for replacing KRYTOX 143AZ with a non-polar PFPE having the same skeleton as KRYTOX 143AZ and a viscosity of 150 cSt at 20° C. ("KRYTOX 143AY" produced by E.I. Du Pont de Nemours & Company (Inc.)).

EXAMPLE 1-2

A magnetic recording tape was prepared in the same manner as in Example 1-1, except that the magnetic layer was subjected to a high humidity treatment at 30° C. and 80% RH for 5 seconds before coating the polar PFPE solution.

Each of the magnetic recording tapes prepared in Examples 1-1 and 1-2 and Comparative Examples 1-1 to 1-4 was evaluated in terms of lubricant adsorption according in the same manner as described above and also evaluated in terms of running durability, still durability, and coefficient of friction in accordance with the following test methods.

1) Adsorption of Lubricant:

The adsorption of a lubricant was evaluated by the ratio of the F peak to the background (F/BG) of ESCA. Since the measurements by ESCA are made at a high degree of vacuum, the excess lubricant which remains unadsorbed is volatilized from the ferromagnetic metal thin film.

2) Still Durability:.

The tape was run on a 8 mmVTR under a running tension of 20 g in an environment of 23° C. and 10% RH. During reproduction, a pose button was pressed, and the time required for disappearance of the image was measured.

3) Coefficient of Friction (μ):

The magnetic tape was contacted with a stainless steel pole under a tension of 50 g ($T_1$) at a wrap angle of 180° C. A tension ($T_2$) required for running the tape at a constant speed of 10 mm/sec was measured. A coefficient of friction (μ) was calculated from the $T_2$ value measured after 100 reciprocal passes at an amplitude of 45 mm according to equation:

$$\mu = (1/\pi) \cdot \ln(T_2/T_1)$$

4) Running Durability:

Running durability of a sample tape was evaluated in terms of occurrence of complete clogging in the same manner as described above. Further, those samples which did not cause complete clogging were evaluated in terms of a frequency of occurrence of momentary clogging per hour. The momentary clogging means continuance of a reduction in output by 6 dB for at least 0.05 second.

The results of these measurements are shown in Table 1 below.

TABLE 1

| Example No. | Lubricant Adsorption (F/BG) | Coefficient of Friction ($\mu$) | Still Durability (min) | Number of Passes for Complete Clogging | | Frequency of Occurrence of Momentary Clogging per Hour | |
|---|---|---|---|---|---|---|---|
| | | | | Run-1 | Run-2 | Run-1 | Run-2 |
| Example 1-1 | 3.01 | 0.26 | 30 or more | no occurrence | no occurrence | 0.04 | 0.50 |
| Example 1-2 | 3.09 | 0.25 | 30 or more | no occurrence | no occurrence | 0.03 | 0.07 |
| Comparative Example 1-1 | 2.49 | 0.26 | 30 or more | 31 | 37 | | |
| Comparative Example 1-2 | 2.92 | 0.28 | 30 or more | 20 | 41 | | |
| Comparative Example 1-3 | 2.90 | 0.31 | 30 or more | 13 | 35 | | |
| Comparative Example 1-4 | 3.06 | 0.28 | 30 or more | 22 | 41 | | |

As can be seen from Table 1, the samples prepared according to the present invention have an increased lubricant adsorption as compared with the comparative samples with the composition of the lubricant(s) being equal and are thereby freed of complete clogging.

According to the present invention, the adsorption of the lubricant can be increased by coating a polar PFPE-containing solution on a ferromagnetic metal thin film and, after a lapse of 6 hours, further coating a non-polar PFPE-containing solution.

EXAMPLE 2-1

On a 10 μm thick polyethylene terephthalate film having fine projections of silica particles (particle size: 250 Å) and mat structures on its surface was deposited a Co—Ni (80/20) alloy by oblique vacuum evaporation by means of a continuous roll coating vacuum evaporation while introducing oxygen gas in the vacuum chamber. The resulting substrate with a magnetic layer is heat treated at 23° C. and 20% RH to correct cupping and then rewound in an atmosphere of 25° C and 80% RH. The contact time of the magnetic layer with high humidity air was 20 seconds. A back coating layer was then formed on the back surface of the non-magnetic support.

A 0.40% by weight solution of Compound 1 ("KRYTOX 157FSL" produced by E.I. Du Pont de Nemours & Company (Inc.); polar group: carboxyl group) in a fluorine solvent (FOMBLIN ZS 100) was coated on the magnetic layer with a wire bar to form a lubricant layer.

EXAMPLE 2-2

A magnetic recording medium was prepared in the same manner as in Example 2-1, except that the high humidity treatment was carried out at 25° C. and 50% RH.

COMPARATIVE EXAMPLE 2-1

A magnetic recording medium was prepared in the same manner as in Example 2-1, except that the high humidity treatment was carried out at 25° C. and 25% RH.

EXAMPLE 2-3

A magnetic recording medium was prepared in the same manner as in Example 2-1, except that the lubricant layer was formed by coating a mixed solution of 0.44% by weight polar PFPE (KRYTOX 157FSL) and 0.11% by weight non-polar PFPE having the following formula ("KRYTOX 143AZ" produced by E.I. Du Pont de Nemours & Company (Inc.); number average molecular weight: 1850 (NMR)) in a fluorine solvent (FOMBLIN ZS 100) by means of a wire bar.

Non-polar PFPE:

EXAMPLE 2-4

A magnetic recording medium was prepared in the same manner as in Example 2-3, except that the high humidity treatment was repeated three times.

COMPARATIVE EXAMPLE 2-2

A magnetic recording medium was prepared in the same manner as in Example 2-3, except that the high humidity treatment was not conducted.

EXAMPLE 2-5

A magnetic recording medium was prepared in the same manner as in Example 2-1, except that the lubricant layer was formed by coating a 0.50% by weight solution of a polar PFPE of the following formula ("KRYTOX 157SL" produced by E.I. Du Pont de Nemours & Company (Inc.); polar group: sulfo group) in a fluorine solvent (FOMBLIN ZS 100) by means of a wire bar.

Polar PFPE:

Carbon atom number of PFPE: 9 to 10

COMPARATIVE EXAMPLE 2-3

A magnetic recording medium was prepared in the same manner as in Example 5, except that the high humidity treatment was not conducted.

EXAMPLE 2-6

A magnetic recording medium was prepared in the same manner as in Example 2-1, except that a 0.25% by weight solution of benzotriazole in methyl ethyl ketone was coated on the magnetic layer before being subjected to the high humidity treatment and dried to form a rust inhibiting layer. The formation of the rust inhibiting layer was carried out in an environment kept at 23° C. and 20% RH.

COMPARATIVE EXAMPLE 2-4

A magnetic recording medium was prepared in the same manner as in Example 2-6, except that the high humidity treatment was not conducted.

COMPARATIVE EXAMPLE 2-5

A magnetic recording medium was prepared in the same manner as in Example 2-1, except that the high humidity treatment was conducted at 60° C.

COMPARATIVE EXAMPLE 2-6

A magnetic recording medium was prepared in the same manner as in Example 2-1, except the lubricant layer was formed by coating a 0.4% by weight solution of a non-polar PFPE (KRYTOX 143AZ).

Each of the magnetic recording media prepared in the foregoing Examples and Comparative Examples was evaluated as follows.

1) Adsorption of Lubricant:

The adsorption of a lubricant was evaluated by the ratio of the F peak to the background (F/BG) of ESCA. Since the measurements by ESCA are made at a high degree of vacuum, the excess lubricant which remains unadsorbed is volatilized from the ferromagnetic metal thin film.

2) Contact Angle:

After the ferromagnetic metal thin film was subjected to a high humidity treatment, the contact angles with water and methylene chloride were measured to calculate the surface free energy.

3) Running Durability:

A 120 min magnetic tape was run 50 times on a commercially available 8 mm VTR ("EV-C10" manufactured by Sony Corp.) at 23° C. and 10% RH to observe occurrence of clogging. Two reels of tape was tested for every sample.

4) Film Strength (Scratch Test):

A diamond stylus having a tip curvature radius of 0.1 mm was vertically set on the magnetic layer of a sample fixed on a plate. The plate with the sample on was pulled to one direction at a speed of 100 mm/min. The minimum load on the stylus which caused a microscopically perceptible scratch on the magnetic layer surface was taken as a measure of the film strength. The test was carried out under conditions of 23° C. and 50% RH.

5 Coefficient of Friction ($\mu$):

A sample tape was contacted with a SUS pole under a tension of 50 g ($T_1$) at an angle of contact of 180°. A tension ($T_2$) required for running the tape at a constant speed of 14 mm/sec was measured. A coefficient of friction ($\mu$) was calculated from the $T_2$ value measured after 100 reciprocal passes at an amplitude of 45 mm according to equation:

$$\mu = (1/\pi) \cdot \ln(T_2/T_1)$$

The test was carried out under conditions of 23° C. and 70% RH.

The results of these measurements are shown in Table 2 below.

TABLE 2

| Example No. | Lubricant Kind (Polar Group) | High Humidity Treatment Temp. (°C.) | High Humidity Treatment RH (%) | F/BG | Surface Free Energy (dyn/cm) | The Number of Passes of Complete Clogging Run-1 | The Number of Passes of Complete Clogging Run-2 | Coefficient of Friction | Film Strength (g) |
|---|---|---|---|---|---|---|---|---|---|
| Example 2-1 | 157FSL (—COOH) | 25 | 80 | 2.88 | 13.9 | 32 | no occurrence | 0.24 | 2.0 |
| Example 2-2 | 157FSL (—COOH) | 25 | 50 | 2.32 | 17.5 | 7 | 41 | 0.24 | 2.0 |
| Comparative Example 2-1 | 157FSL (—COOH) | 25 | 20 | 2.11 | 20.5 | 10 | 6 | 0.25 | 2.0 |
| Example 2-3 | 157FSL (—COOH) + 143AZ (none) | 25 | 80 | 3.07 | 12.7 | no occurrence | no occurrence | 0.26 | 2.0 |
| Example 2-4 | 157FSL (—COOH) + 143AZ (none) | 25 | 80 | 2.94 | 13.4 | no occurrence | no occurrence | 0.26 | 2.0 |
| Comparative Example 2-2 | 157FSL (—COOH) + 143AZ (none) | no treatment | | 2.34 | 17.6 | 17 | 36 | 0.26 | 2.0 |
| Example 2-5 | 157SL (—SO$_2$—) | 25 | 80 | 2.83 | 19.6 | no occurrence | no occurrence | 0.29 | 2.0 |
| Comparative Example 2-3 | 157SL (—SO$_2$—) | no treatment | | 2.45 | 26.4 | 10 | no occurrence | 0.28 | 2.0 |
| Example 2-6 | 157FSL (—COOH) + 143AZ (none) | 25 | 80 | 3.08 | 12.9 | 35 | 41 | 0.28 | 2.0 |
| Comparative Example 2-4 | 157FSL (—COOH) + 143AZ (none) | no treatment | | 2.52 | 15.9 | 9 | 16 | 0.28 | 2.0 |
| Comparative Example 2-5 | 157FSL (—COOH) | 60 | 80 | 2.72 | 13.6 | 39 | 45 | 0.26 | 1.0 |
| Comparative Example 2-6 | 143AZ (none) | 25 | 80 | 1.38 | 21.5 | incapable of running | | 0.40 | 2.0 |

The sample prepared in Example 2-6 or Comparative Example 2-4 was cut to a 8 mm width and reeled up. The reel was allowed to stand in an aging environment of 60° C. and 90% RH (hereinafter referred to as environment 1) for 3 days. The reflectance of the tape was measured before and after the aging to evaluate weather resistance. Further, the tape was adhered on a mount and allowed to stand in an environment containing 1 ppm of $SO_2$ gas at 60° C. and 90% RH (hereinafter referred to as environment 2) for 3 days, and the tape was visually observed to evaluate anticorrosion against corrosive gas. The results obtained are shown in Table 3 below.

TABLE 3

| Example No. | Change of Reflectance in Environment 1 | Surface Change in Environment 2 |
| --- | --- | --- |
| Example 2-6 | 23% to 22% | corrosion observed in very small part |
| Comparative Example 2-4 | 23% to 21% | corrosion observed on the entire surface |

As demonstrated above, the magnetic recording medium prepared according to the present invention has an increased lubricant adsorption and is excellent in running durability, particularly anti-clogging properties.

The present invention also provides a ferromagnetic metal thin film type magnetic recording medium in which a lubricant layer is composed of a lower layer comprising a polar PFPE having a viscosity of from 200 to 1000 cSt at room temperature and an upper layer comprising a non-polar PFPE having a viscosity of not more than 50 cSt at room temperature. In this type of media, functions of a lubricant layer are separately performed by the polar PFPE layer which forms a stable boundary lubrication film on the interface with the ferromagnetic metal thin film and by the non-polar PFPE layer which acts for fluid lubrication. As a result, the absolute adsorption of each lubricant is increased with increased adsorptivity to improve the lubricating effect. Accordingly, the magnetic recording medium exhibits satisfactory running durability and markedly improved anti-clogging properties.

The present invention provides a process in which a ferromagnetic metal thin film formed on a non-magnetic support by oblique vacuum evaporation is subjected to a high humidity treatment to modify the surface of the metal thin film, on which a lubricant having a polar group in the molecule thereof is then coated. According to this process, adsorption of the lubricant on the magnetic layer is enhanced with an increased absolute adsorption whereby the lubricating action lasts long and clogging can effectively be prevented. In addition, the process is an economically advantageous process which can be carried out in a very simple manner without requiring any additional equipment.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having thereon a ferromagnetic metal thin film, wherein the ferromagnetic metal thin film has provided thereon a double lubricant layer comprising (i) a lower layer comprising a polar group-containing perfluoropolyether and (ii) an upper layer comprising a perfluoropolyether having no polar group, the polar group-containing perfluoropolyether having a viscosity from 200 to 1000 cSt at room temperature and the perfluoropolyether having no polar group having a viscosity of 30 to 50 cSt at room temperature, wherein the ferromagnetic metal thin film formed on the non-magnetic support is subjected to a high humidity treatment for 5 to 30 seconds in an atmosphere of from 60 to 80% RH at a temperature of from 20° to 40° C. before application of the double lubricant layer.

2. The magnetic recording medium as in claim 1, wherein the polar group-containing perfluoropolyether has a viscosity of from 200 to 600 cSt at room temperature.

3. The magnetic recording medium as in claim 1, wherein the polar group-containing perfluoropolyether has a main chain selected from the group consisting of a perfluoro-n-propylene oxide polymer, a perfluoroisopropylene oxide polymer, a perfluroethylene oxide polymer, a perfluoromethylene oxide polymer and a copolymers thereof.

4. The magnetic recording medium as in claim 1, wherein the polar group of the polar group-containing perfluoropolyether is selected from the group consisting of an oxo acid group, a sulfone group, a sulfoxide group and a diphenyl group.

5. The magnetic recording medium as in claim 1, wherein the coated amount of the polar group-containing perfluoropolyether is from 4 to 30 mg/m$^2$.

6. The magnetic recording medium as in claim 1, wherein the perfluoropolyether having no polar group has a main chain selected from the group consisting of a perfluoro-n-propylene oxide polymer, a perfluoroisopropylene oxide polymer, a perfluoroethylene oxide polymer, a perfluoromethylene oxide polymer and a copolymers thereof.

7. The magnetic recording medium as in claim 1, wherein the coated amount of the perfuoropolyether having no polar group is from 1.0 to 30 mg/m$^2$.

8. A process for producing a magnetic recording medium comprising subjecting a ferromagnetic metal thin film formed on a non-magnetic support by vacuum film formation to a high humidity treatment in an atmosphere of from 60 to 80% RH at a temperature of from 20° to 40° C. for 5 to 30 seconds and then applying a lubricant having a polar group in the molecule thereof to the thus treated ferromagnetic metal thin film.

9. The process as in claim 8, wherein the coated amount of the lubricant having a polar group is from 4 to 30 mg/m$^2$.

10. The process as in claim 8, wherein the lubricant having a polar group is a perfluoropolyether having a polar group.

11. The process as in claim 8, further comprising the step of applying an upper layer comprising a lubricant having no polar group on a lower layer comprising the lubricant having a polar group.

* * * * *